(12) United States Patent
Kamath et al.

(10) Patent No.: US 8,788,864 B2
(45) Date of Patent: Jul. 22, 2014

(54) COORDINATED APPROACH BETWEEN MIDDLEWARE APPLICATION AND SUB-SYSTEMS

(75) Inventors: Sunil J. Kamath, Markham (CA); Bernhard K. Schiefer, Pickering (CA); Linton B. Ward, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/271,490

(22) Filed: Oct. 12, 2011

(65) Prior Publication Data
US 2012/0096287 A1 Apr. 19, 2012

(30) Foreign Application Priority Data

Oct. 14, 2010 (CA) ...................................... 2716646

(51) Int. Cl.
*G06F 1/32* (2006.01)

(52) U.S. Cl.
USPC .......................... 713/323; 713/320; 718/104

(58) Field of Classification Search
CPC .... Y02B 60/14; Y02B 60/142; Y02B 60/144; Y02B 60/18; Y02B 60/186
USPC ........... 713/300, 320, 323; 718/100, 103, 104
See application file for complete search history.

(56) References Cited

U.S. PATENT DOCUMENTS

| | | | |
|---|---|---|---|
| 8,271,807 B2 * | 9/2012 | Jackson | 713/300 |
| 2008/0288748 A1 | 11/2008 | Sutardja et al. | |
| 2009/0119673 A1 * | 5/2009 | Bubba | 718/104 |
| 2009/0132840 A1 | 5/2009 | Talwar et al. | |

OTHER PUBLICATIONS

Christopher Gill et al., "Middleware Scheduling Optimization Techniques for Distributed Real-Time and Embedded Systems", Washington Univeristy, St. Louis. http://eprints.kfupm.edu.sa/50712/1/50712.pdf (2002).

F.A. Samimi et al., "Kernel-Middleware Interactoin to Support Adaptation in Pervasive Computing Environments", ACM International Conference Proceeding Series; vol. 77, Proceedings of the 2nd workshop on Middleware for pervasive and ad-hoc computing, pp. 140-145, 2004. http://www.smarlab.cis.strath.ac.uk/MPAC/2004/MPAC2004_Papers/MPAC17-samimi.pdf.

G. Kaefer et al., "Power Aware Middleware", Proceedings of the Fifteenth IASTED International Conference on Parallel and Distributed Computing and Systems (PDCS 2002), Marina del Ray, CA Nov. 2003. http://www.iti.tugraz.at/en/people/kaefer/publications/powerawaremiddleware.pdf.

S. Mohapatra et al., "Context Sensitive Adaptations for End-to-End Energy Management", Distributed System Middleware Group, University of California, Irvine. Jun. 2004. http://formal.cs.uiuc.edu/contessa/june04-mopy.pdf.

(Continued)

*Primary Examiner* — Glenn A Auve
(74) *Attorney, Agent, or Firm* — Cantor Colburn LLP; Ingrid Foerster

(57) ABSTRACT

A method of managing power in a computing system is provided. The method comprises: assessing incoming work; assessing service level agreements related to the incoming work; and coordinating with an operating system layer to control hardware of the computing system based on the service level agreements and a power consumption goal.

31 Claims, 3 Drawing Sheets

(56) References Cited

OTHER PUBLICATIONS

Wanghong Yuan et al., "A Middleware Framework Coordinating Processor/Power Resource Management for Multimedia Applications", Global Telecommunications Conference, 2001. GLOBECOM apos; 01. IEEE vol. 3, Issue, 2001, pp. 1984-1988. http://cairo.cs.uiuc.edu/publications/papers/Yuan-globecom01.pdf.

Xiaorui Wang et al., "Power-Aware CPU Utilization Control for Distributed Real-Time Systems", Proceedings of the 2009 15th IEEE Real-Time and Embedded Technology and Applications Symposium—vol. 00, pp. 233-242, 2009. http://www.ece.utk.edu/~xwang/papers/rtas09.pdf.

\* cited by examiner

COORDINATED APPROACH BETWEEN MIDDLEWARE APPLICATION AND SUB-SYSTEMS

CROSS-REFERENCES TO RELATED APPLICATIONS

This patent application claims priority to Canadian Patent Application No. 2716646 filed Oct. 14, 2010, which is incorporated herein by reference in its entirety.

BACKGROUND

The present invention relates to systems, methods, and computer program products for managing power consumption in computing systems.

A growing emphasis has been placed on power efficiency in data processing equipment. Improvements are needed in the power efficiency of server computing systems under varying load conditions. Unlike desktops or laptops, server systems may have extended periods of very high utilization, and may experience sudden surges or spikes in demand. Servers may be sized for daytime, end of month, end of quarter or end of year processing, leaving significant durations where the overall usage activity of the system is far below the peak capacity. These temporal variations in workload demand provide an opportunity to reduce energy demand.

Many operational environments exhibit rapidly changing demand such as spikes due to external events, or due to the normal business workflow. If spare capacity is configured to support these surges, as often is the case, then the power can be reduced if the system can transition sufficiently fast when a surge occurs. Conventional approaches to lowering power of the whole system in underutilized servers may impact user response time of database processing systems and therefore result in missing service level agreements (SLAs), or may be slow to react to increases in demand leading to unacceptable degradation in user response time.

SUMMARY

In an exemplary embodiment, a method of managing power in a computing system is provided. The method comprises: assessing incoming work; assessing service level agreements related to the incoming work; and coordinating with an operating system layer to control hardware of the computing system based on the service level agreements and a power consumption goal.

BRIEF DESCRIPTION OF THE SEVERAL VIEWS OF THE DRAWINGS

The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

Figure 1:
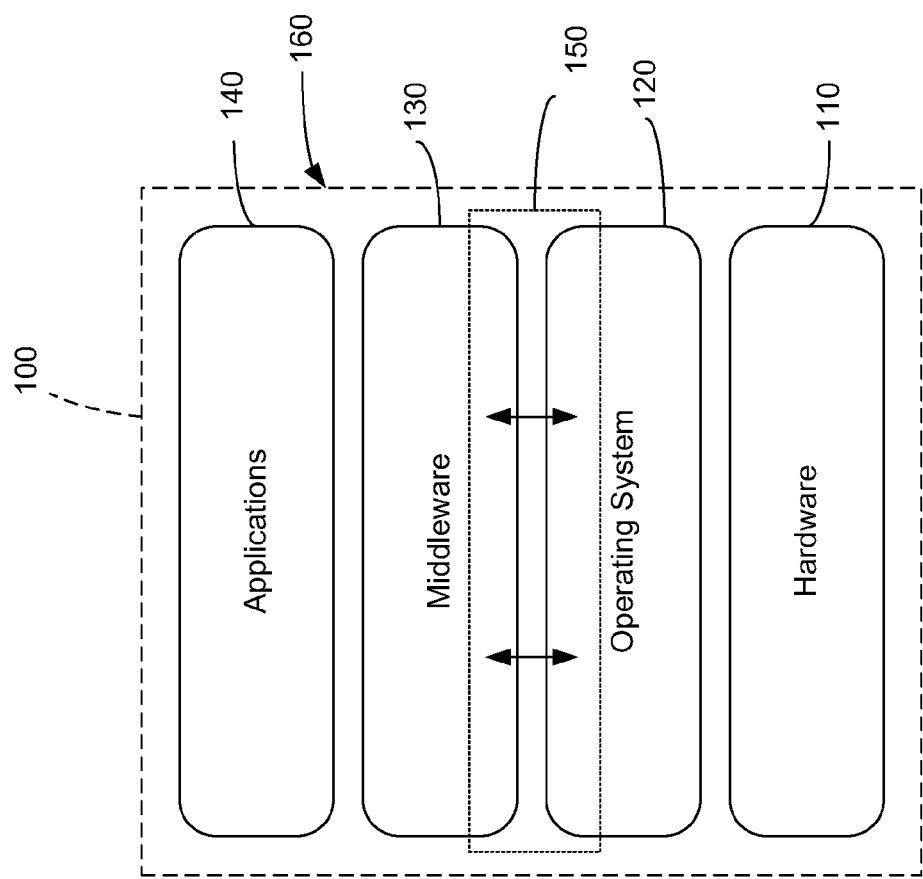
FIG. 1 is a block diagram illustrating a computing system that includes a power management system in accordance with an exemplary embodiment.

In accordance with an exemplary embodiment of the present invention, a power management system that selectively manages the power consumption of a computing system is provided. As can be appreciated, the following description is merely exemplary in nature and is not intended to limit the present disclosure, application, or uses. It should be understood that throughout the drawings, corresponding reference numerals indicate like or corresponding parts and features.

Turning now to FIG. 1, the block diagram illustrates a computing system 100 that is illustrated as a multi-layer system in accordance with an exemplary embodiment. The multi-layer system includes, for example, but is not limited to, a hardware layer 110, an operating systems layer 120, a middleware layer 130, and an applications layer 140.

The applications layer 140 may include one or more software applications that are stored in and performed by hardware of the hardware layer 110. The hardware layer 110 may include, for example, any combination of one or more processors, memory devices, input/output interfaces, busses, device and network interconnects, management processors, etc. When in use, the components of the hardware layer 110 consume power in some manner or another. The operating system layer 120 includes an operating system. The operating system essentially controls the performance of the applications of the application layer 140 by interacting with the hardware in the hardware layer 110 to provide scheduling, input-output control, file and data management, memory management, and communication control and related services.

The middleware layer 130 according to the present disclosure interfaces with the various applications of the applications layer 140 as well as with the operating systems layer 120 to assist with the coordination of the performance of the application by the operating system layer 120. According to the present disclosure, the middleware layer 130 and the operating systems layer 120 include features that enable the management of the power consumption of the hardware components in the computing system. Collectively, the features make up the power management system 160 of the present disclosure. In particular, the middleware layer 130 includes one or more modules that evaluate the incoming workload and the associated work response time objectives. Based on the evaluation, the middleware layer 130 coordinates with the operating system layer 120 to create and execute a plan for reducing resources. A two-way communication loop 150 is provided between the middleware layer 130 and the operating systems layer 120 to ensure that service level agreements related to the tasks and target power objectives are met.

Figure 2:
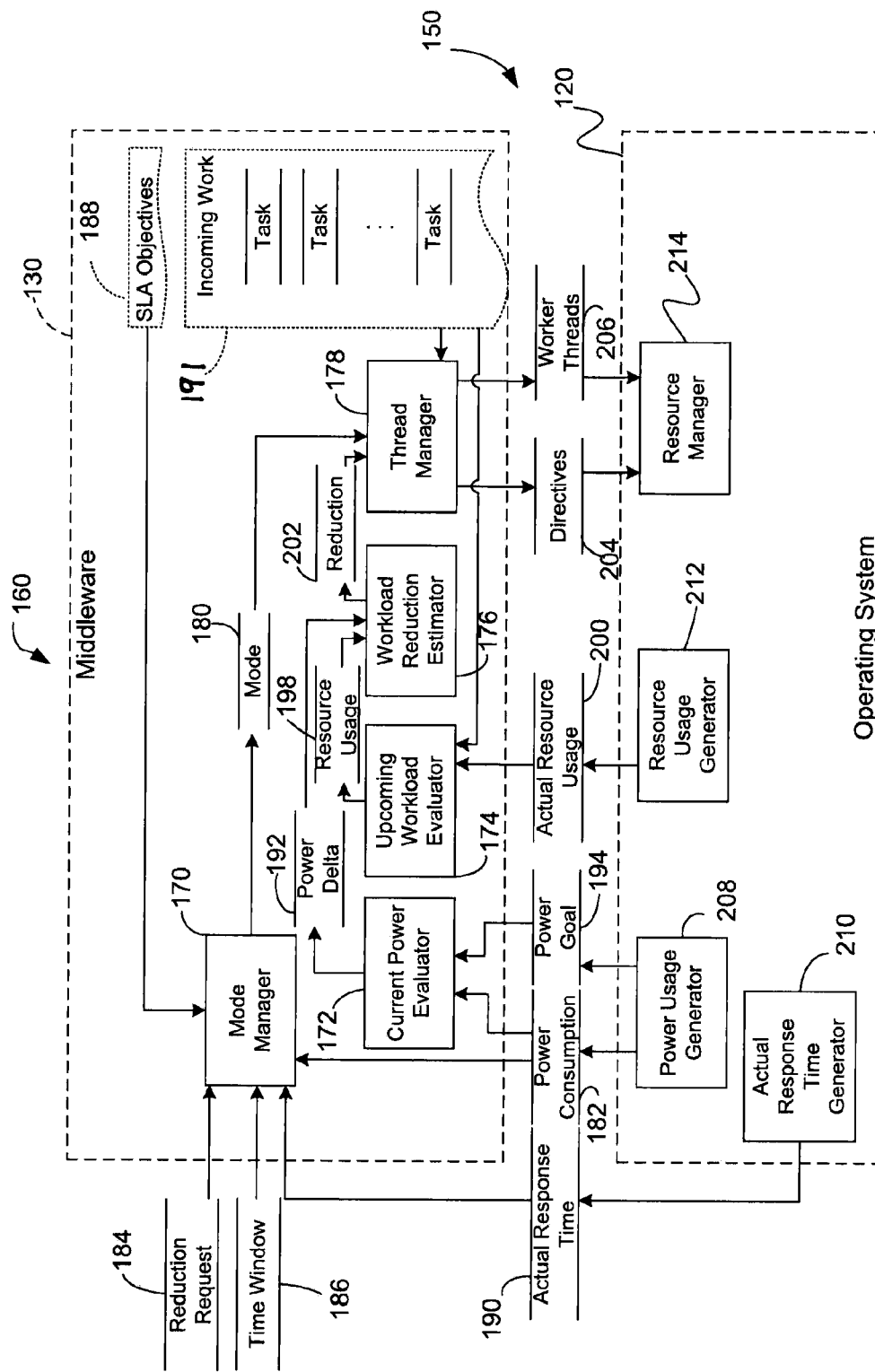
FIG. 2 is dataflow diagram illustrating a power management system in accordance with an exemplary embodiment.

Turning now to FIG. 2, the power management system 160 of the middleware layer 130 and the operating system layer 120 is shown in more detail in accordance with an exemplary embodiment. Each layer 120, 130 includes one or more sub-modules and datastores. As can be appreciated, the sub-modules can be implemented as software, hardware, firmware, a combination thereof, and/or other suitable components that provide the described functionality. As can be appreciated, the sub-modules shown in FIG. 2 can be combined and/or further partitioned to similarly manage power consumption in the computing system 100. In various embodiments, the middleware layer includes modules such as, a mode manager 170, a current power evaluator 172, a workload evaluator 174, a workload reduction estimator 176, and a thread manager 178.

The mode manager 170 determines an energy management mode 180 based on one or more inputs. In various embodiments, the energy management mode 180 can be one of a mandatory energy savings mode, a proactive energy management mode, and a no-action mode. The mode manager 170 can determine the energy management mode 180 to be the mandatory energy savings mode based on inputs such as current power consumption 182, a user initiated reduction request 184, and/or a required reduction time window 186. For example, if the power consumption 182 as indicated by the operating systems layer 120 is above a threshold level (i.e., too high), the mode manager 170 determines the energy management mode 180 to be the mandatory energy savings mode. In another example, if a user initiated reduction request 184 is received, the mode manager 170 determines the energy management mode 180 to be the mandatory energy savings mode. In yet another example, if the current time is within the preconfigured time window 186, the mode manager 170 determines the energy management mode 180 to be the mandatory energy savings mode.

In various embodiments, the mode manager 170 can determine the energy management mode 180 to be the proactive energy management mode based on service level agreement (SLA) objectives 188, actual response times 190 of work that has been performed by the hardware layer 110 (FIG. 1), and/or incoming work 191. For example, if the actual response times 190 for various job tasks of the various priority levels (i.e., high priority work, medium priority work, low priority work) meet or exceed the response time objectives as indicated by the SLAs, and estimated response times for various job tasks of the various priority levels indicate that there is opportunity for degradation (i.e., the estimated response time far exceeds the response time objectives), then the mode manager 170 determines the energy management mode 180 to the be proactive energy management mode. In various embodiments, the mode manager 170 can determine the estimated response times for the incoming work 191. In various other embodiments, other modules can determine the estimated response times.

The mode manager 170 can determine the energy management mode 180 to be the no-action mode when the conditions for the mandatory energy management mode and the proactive energy management mode have not been met. For example, the no-action mode is the default mode when no energy management is desired.

The power evaluator 172 queries the operating system layer 120 for the current power consumption 182. The power evaluator 172 computes a delta 192 between the current power consumption 182 and a power consumption goal 194. In various embodiments, the power consumption goal 194 is indicated by the operating system layer 120, or is indicated by a user or entity via a configurable parameter. The delta 192 indicates the extent of power usage that should be reduced to achieve the power consumption goal 194.

The workload evaluator 174 evaluates the incoming work 196 and estimates a resource usage 198 (e.g., the CPU usage and power usage) that is needed to perform the incoming work 196 that is ready to be dispatched for performance. In various embodiments, a resource usage estimate is generated on a per task basis and then an overall resource usage estimate is generated based on an aggregate of the per task resource usage estimates. In various embodiments, the resource usage 198 is provided in timerons by, for example, existing optimizer costing mechanisms. In various embodiments, a calibration function can be created that continuously works to close the gap between estimation and real-time CPU resource consumption. For example, the calibration function dynamically maps estimated timerons with actual hardware resource consumed.

The workload reduction estimator 176 receives as input the resource usage 198. Based on the resource usage 198, the workload reduction estimator 176 generates a reduction plan 202. For example, the workload reduction estimator 176 evaluates hardware resources for the middleware for new work and power required, hardware resources currently consumed for executing current tasks and power drawn, configured power saving mode, and target power to achieve and determines the actions.

The thread manager 178 generates directives 204 to the operating system layer 120 for the use of more or less resources, generates information for the operating system layer 120 relating to latency sensitivity of a particular process or thread via worker threads 206, and responds to surges in demand.

In particular, based on the energy management mode 180 and the work reduction plan 202, the thread manager 178 performs one or more of the following: reduces or stops non-critical background job/tasks to aid effective CPU folding; tags appropriate middleware threads as sensitive to single thread performance so that they can be scheduled on high performance cores; reduces the number of processes/threads by multiplexing application jobs using fewer middleware threads; reduces the degree of concurrency to process application jobs; or reduces or throttles the application jobs being submitted to the middleware during peak power consumption.

In various embodiments, the thread manager can further evaluate the incoming work 196 and inform the operating system layer 120 of the level of performance needed for the software threads (e.g., high performance, medium performance, low performance).

Turning now to the operating systems layer 120, in various embodiments, the modules include, for example, a power usage generator 208, an actual response time generator 210, a resource usage generator 212, and a resource manager 214.

The power usage generator 208, the actual response time generator 210, and the resource usage generator 212 generates the actual response time 190, the actual power consumption 182, and the actual resource usage 200, respectively based on one or more operating system layer techniques known in the art.

The resource manager 214 receives as input the directives 204 and the worker threads 206. The resource manager 214 evaluates the directives 204 and the worker threads 206 and provides heterogeneous hardware thread performance, enabling the lowest power state (and lowest power threads) for most threads while reserving higher thread performance for the high performance threads. The resource manager 214 communicates with the hardware layer 110 (FIG. 1) to effectively fold and unfold CPUs and/or schedule performance sensitive single threads to faster cores. This allows for meeting power and performance objectives of high priority tasks.

The power management system 160 introduces prioritization and classification of the workload and ensures to mitigate the disruption of high priority and response time sensitive activities. The framework includes service level objectives in terms of end-to-end response time criteria of the workload and classification of workload into high priority, medium priority and low priority buckets. The total response time includes the network, CPU and IO time required to service the job. For CPU folding, the wait times for IO and network is discarded as they are usually wasted CPU cycles. The CPU and IO cost is estimated using existing database optimizer costing mechanisms that provides the cost (in units of timerons) associated with executing a query. The middleware can then aggregate the timerons required for the overall workload to estimate the total CPU required to execute the workload.

Figure 3:
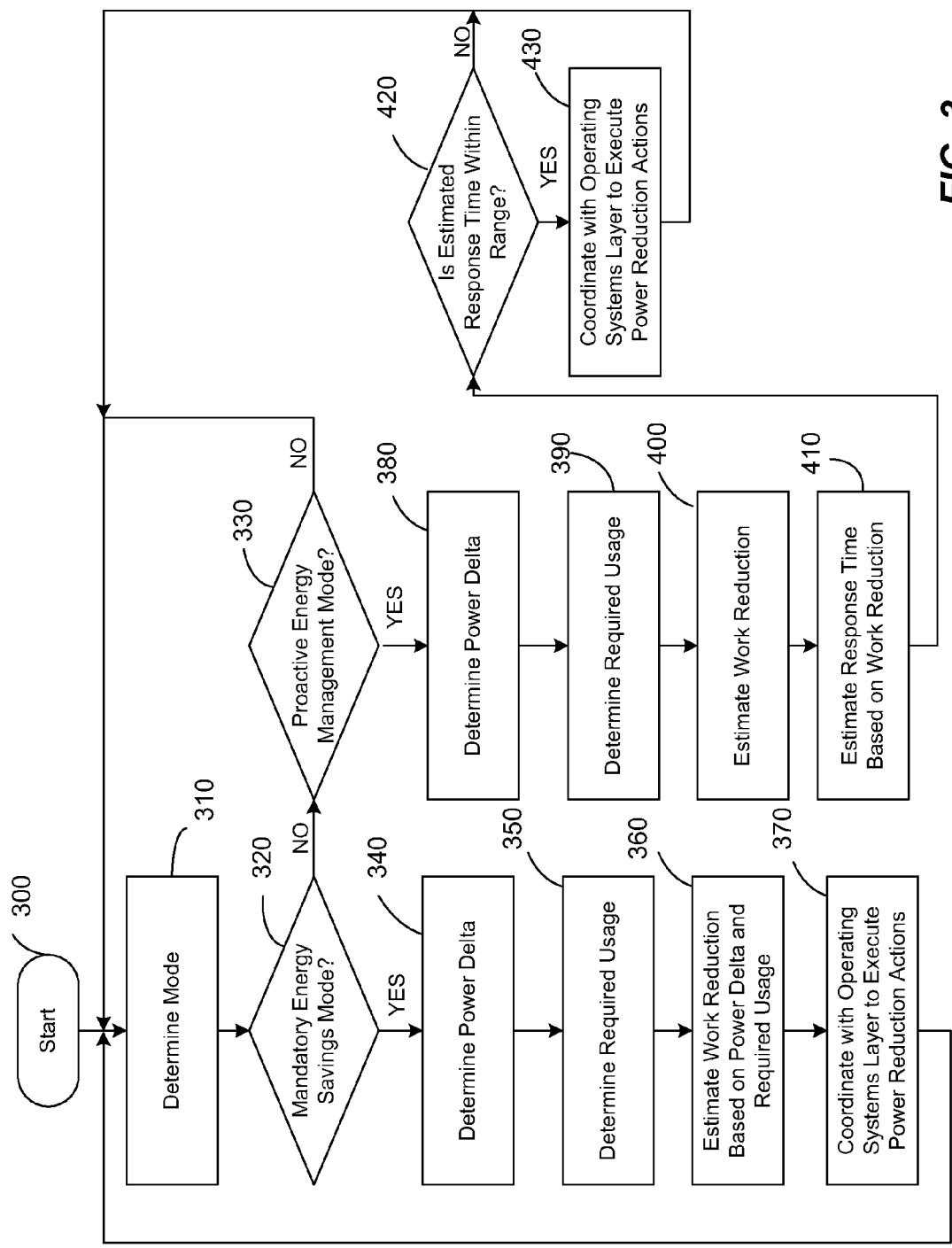
FIG. 3 is a flowchart illustrating a power management method in accordance with an exemplary embodiment.

Turning now to FIG. 3 and with continued reference to FIG. 2, a flowchart illustrates a power management method that can be performed by power management system of FIG. 2 in accordance with an exemplary embodiment. As can be appreciated in light of the disclosure, the order of operation within the method is not limited to the sequential performance as illustrated in FIG. 3, but may be performed in one or more varying orders as applicable and in accordance with the present disclosure. As can be appreciated, one or more steps can be added or deleted from the method without altering the spirit of the method.

In one example, the method may begin at 300. The energy management mode 180 is determined at 310 based on, the reduction request, the actual power consumption, and/or the time. The energy management mode is then evaluated at 320 and 330. If, at 320, the energy management mode is the mandatory energy savings mode at 320, the power delta is determined between the actual power consumed and the power consumption goal at 330. The estimated resource usage for incoming work is then determined based on CPU and power usage at 350. The work reduction is then estimated based on the power delta and the resource usage at 360. The middleware then coordinates with the operating systems layer to execute power reduction actions to achieve the work reduction. Thereafter, the method continues with monitoring the mode at 310.

If, however, at 320, the energy management mode is not the mandatory energy savings mode, rather is the proactive energy management mode at 330, the power delta is determined between the actual power consumed and the power consumption goal at 330. The estimated resource usage for incoming work is then determined based on CPU and power usage at 350. The work reduction is then estimated based on the power delta and the resource usage at 360. The CPU response time is then estimated based on the work reduction at 380. If the response time is within a desired range (e.g., as indicated by SLA requirements), the middleware then coordinates with the operating systems layer to execute power reduction actions to achieve the work reduction and the method continues with monitoring the mode at 310. If, however, the response time is not within a desired range at 420, no action is taken and the method continues with monitoring the mode at 310.

As can be appreciated, the flowcharts and block diagrams in the Figures illustrate the architecture, functionality, and operation of the possible implementations of systems, methods, and computer program products according to various embodiments of the present disclosure. In this regard, each block in the flowchart or block diagrams may represent a module, segment, or a portion of code, which comprises one or more executable instructions for implementing the specified logical functions. It should also be noted that, in some alternative implementations, the functions noted in the block may occur out of the order noted in the Figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts can be implemented by special purpose hardware-based systems that perform the specified functions or acts, or combinations of special purpose hardware and computer instructions.

As one example, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While a preferred embodiment has been described, it will be understood that those skilled in the art, both now and in the future, may make various improvements and enhancements which fall within the scope of the claims which follow. These claims should be construed to maintain the proper protection for the disclosure first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed. The disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of managing power in a computing system, comprising:
   performing by a processor:
      assessing incoming work;
      assessing service level agreements related to the incoming work;
      coordinating with an operating system layer to control hardware of the computing system based on the service level agreements and a power consumption goal; and
      performing at least one of reducing a selected number of background tasks and stopping all background tasks based on the power consumption goal.

2. The method of claim 1 wherein the assessing incoming work further comprises prioritizing the incoming work as at least one of high priority, medium priority, and low priority.

3. The method of claim 2 wherein the assessing the incoming work is performed on a task by task basis.

4. The method of claim 1 further comprising selectively determining an energy management mode based on at least one of a current power consumption, a power consumption goal, a reduction request, and a time window.

5. The method of claim 4 wherein the coordinating with an operating system layer is performed based on the energy management mode.

6. The method of claim 1 further comprising reducing a degree of concurrency to process application jobs based on the power consumption goal.

7. A system for managing power in a computing system, comprising:
   a mode manager that determines an energy management mode based on a power consumption and service level agreements related to incoming work; and
   a thread manager that coordinates with an operating system layer to control hardware of the computing system based on the energy management mode and that performs at least one of reducing a selected number of background tasks and stopping all background tasks based on the energy management mode.

8. The system of claim 7 wherein the thread manager assesses incoming work and prioritizes the incoming work as at least one of high priority, medium priority, and low priority.

9. The system of claim 8 wherein the thread manager assesses the incoming work on a task by task basis.

10. The system of claim 7 wherein the mode manager selectively determines the energy management mode further based on at least one a power consumption goal, a reduction request, and a time window.

11. The system of claim 7 further comprising a workload estimator that estimates resource usage based on the incoming work, and wherein the thread manager coordinates with an operating system layer to control hardware of the computing system based on the resource usage.

12. The system of claim 7 wherein the thread manager coordinates with the operating system layer based on at least one of prioritizing threads and generating directives.

13. A system for managing power in a computing system, comprising:
   a middleware layer that assesses incoming work and service level agreements related to the incoming work, and that generates at least one of directives and worker threads based on the assessing, wherein the directives comprise at least one of reducing a selected number of background tasks and stopping all background tasks based on a power consumption goal; and
   an operating system layer that controls hardware of the computing system based on at least one of the directives and the worker threads.

14. The system of claim 13 wherein the middleware layer assesses the incoming work by prioritizing the incoming work as at least one of high priority, medium priority, and low priority.

15. The system of claim 13 wherein the middleware layer assesses the incoming work on a task by task basis.

16. The system of claim 13 wherein the middleware layer selectively determines an energy management mode based on at least one of a current power consumption, a power consumption goal, a reduction request, and a time window.

17. The system of claim 16 wherein the middleware layer generates the at least one of directives and worker threads based on the energy management mode.

18. A computer program product for managing power in a computing system, the computer program product comprising:
   a tangible storage medium readable by a processing circuit and storing instructions for execution by the processing circuit for performing a method comprising:
      assessing incoming work;
      assessing service level agreements related to the incoming work;
      coordinating with an operating system layer to control hardware of the computing system based on the service level agreements and a power consumption goal; and
      performing at least one of reducing a selected number of background tasks and stopping all background tasks based on the power consumption goal.

19. The computer program product of claim 18 wherein the assessing incoming work further comprises prioritizing the incoming work as at least one of high priority, medium priority, and low priority.

20. The computer program product of claim 19 wherein the assessing the incoming work is performed on a task by task basis.

21. The computer program product of claim 18 further comprising selectively determining an energy management mode based on at least one of a current power consumption, a power consumption goal, a reduction request, and a time window.

22. The computer program product of claim 21 wherein the coordinating with an operating system layer is performed based on the energy management mode.

23. The computer program product of claim 18 further comprising reducing a degree of concurrency to process application jobs based on the power consumption goal.

24. A method of managing power in a computing system, comprising:
   performing by a processor:
      assessing incoming work;
      assessing service level agreements related to the incoming work;
      coordinating with an operating system layer to control hardware of the computing system based on the service level agreements and a power consumption goal; and
      selectively tagging threads such that they are performed on specific hardware based on the power consumption goal.

25. A method of managing power in a computing system, comprising:
   performing by a processor:
      assessing incoming work;
      assessing service level agreements related to the incoming work;
      coordinating with an operating system layer to control hardware of the computing system based on the service level agreements and a power consumption goal; and
      reducing a number of threads by multiplexing jobs using fewer middleware threads based on the power consumption goal.

26. A system for managing power in a computing system, comprising:
   a mode manager that determines an energy management mode based on a power consumption and service level agreements related to incoming work;
   a thread manager that coordinates with an operating system layer to control hardware of the computing system based on the energy management mode and that selectively tags threads such that they are performed on specific hardware based on the energy management mode.

27. A system for managing power in a computing system, comprising:
- a mode manager that determines an energy management mode based on a power consumption and service level agreements related to incoming work;
- a thread manager that coordinates with an operating system layer to control hardware of the computing system based on the energy management mode and that reduces a number of threads by multiplexing jobs using fewer middleware threads based on the energy management mode.

28. A system for managing power in a computing system, comprising:
- a middleware layer that assesses incoming work and service level agreements related to the incoming work, and that generates at least one of directives and worker threads based on the assessing, wherein the directives comprise selectively tagging threads such that they are performed on specific hardware based on a power consumption goal; and
- an operating system layer that controls hardware of the computing system based on at least one of the directives and the worker threads.

29. A system for managing power in a computing system, comprising:
- a middleware layer that assesses incoming work and service level agreements related to the incoming work, and that generates at least one of directives and worker threads based on the assessing, wherein the directives comprise reducing a number of threads by multiplexing jobs using fewer middleware threads based on a power consumption goal; and
- an operating system layer that controls hardware of the computing system based on at least one of the directives and the worker threads.

30. A computer program product for managing power in a computing system, the computer program product comprising:
- a tangible storage medium readable by a processing circuit and storing instructions for execution by the processing circuit for performing a method comprising:
  - assessing incoming work;
  - assessing service level agreements related to the incoming work;
  - coordinating with an operating system layer to control hardware of the computing system based on the service level agreements and a power consumption goal; and
  - selectively tagging threads such that they are performed on specific hardware based on the power consumption goal.

31. A computer program product for managing power in a computing system, the computer program product comprising:
- a tangible storage medium readable by a processing circuit and storing instructions for execution by the processing circuit for performing a method comprising:
  - assessing incoming work;
  - assessing service level agreements related to the incoming work;
  - coordinating with an operating system layer to control hardware of the computing system based on the service level agreements and a power consumption goal; and
  - reducing a number of threads by multiplexing jobs using fewer middleware threads based on the power consumption goal.

* * * * *